United States Patent
Emig

[11] Patent Number: 5,806,985
[45] Date of Patent: Sep. 15, 1998

[54] ROD GUIDE AND METHOD FOR ITS MANUFACTURE

[75] Inventor: Juergen Emig, Grasellenbach, Germany

[73] Assignee: Firma Carl Freudenberg, Weinheim, Germany

[21] Appl. No.: 782,726

[22] Filed: Jan. 13, 1997

[30] Foreign Application Priority Data

Jan. 12, 1996 [DE] Germany ............... 196 00 870.0

[51] Int. Cl.$^6$ ........................................ F16C 33/08
[52] U.S. Cl. ............... 384/42; 384/29; 384/295; 384/908
[58] Field of Search ............ 384/26, 29, 32, 384/41, 42, 276, 282, 295, 297–300, 908

[56] References Cited

U.S. PATENT DOCUMENTS

| | | | |
|---|---|---|---|
| 2,809,130 | 10/1957 | Rappaport | 384/300 |
| 3,070,408 | 12/1962 | Reuter | 384/300 |
| 3,608,170 | 9/1971 | Larson et al. | 384/276 X |
| 4,123,122 | 10/1978 | Gabrielson et al. | 384/300 |
| 4,158,511 | 6/1979 | Herbenar | 384/297 X |
| 4,358,167 | 11/1982 | Magazian et al. | 384/300 X |
| 5,328,273 | 7/1994 | Nonaka et al. | 384/208 X |
| 5,435,650 | 7/1995 | Emig et al. | 384/29 |
| 5,445,896 | 8/1995 | Tanaka et al. | 384/812 X |

*Primary Examiner*—Thomas R. Hannon
*Attorney, Agent, or Firm*—Kenyon & Kenyon

[57] ABSTRACT

A rod guide, comprising a guide bush, which is surrounded on the outside by a carrier with respect to which there is a radial clearance. A connector is provided in the gap formed by the clearance, which form locks with the guide bush, thereby preventing translatory motion between them.

19 Claims, 4 Drawing Sheets

ROD GUIDE AND METHOD FOR ITS MANUFACTURE

BACKGROUND OF THE INVENTION

1. Field of the Invention

The invention relates to a rod guide of the general type having a guide bush that is surrounded on the outside by a carrier and joined to the carrier.

2. Description of Related Art

Such a rod guide is known from the German patent 43 03 177 A1 and its U.S. Counterpart, U.S. Pat. No. 5,435,650 which is incorporated herein by reference. In that patent, a rod guide is provided for a rod or shaft that is relatively movable in parallel to its axis. The rod guide has a plastic guide ring that is inserted into an outer ring. The outer ring and the guide ring are directly joined to one another and have a continuously uninterrupted contact area. The joining is effected in such a way that the outer ring is provided with grooves that are open radially inwardly and have cross-sectional narrowings in the area of their openings, and the guide ring is provided with projections protruding radially outwardly which are accommodated in the grooves. To join them to one another in the radial direction, the outer ring and the guide ring are pressed against each other in such a way that the material of which the guide ring consists flows into the grooves of the outer ring and thereby forms the projections.

SUMMARY OF THE INVENTION

The present invention is directed towards the further development of a rod guide and a method for manufacturing a rod guide, the rod guide having a guide bush that can be durably secured without deformation in a carrier even when the rod guide is used in temperature ranges from minus 50° to plus 180° C. The manufacturing method employed is both simple and economically cost-effective.

In accordance with the invention, a carrier surrounds a guide bush with a radial clearance and a connecting means or connector is provided in the gap formed by the clearance. Advantageously, there is no need to deform the guide bush to attach it to the carrier, since the connecting means provided between the carrier and the guide bush joins the two parts to one another.

Using a bridging connector to link the guide bush to the carrier is particularly advantageous where the guide bush consists of a polymer material and the carrier consists of a metallic material. For example, because of its material properties, a preferred polymer material for use as a guide bush is polytetraflouroethylene (PTFE). The direct premolding of the PTFE guide bush to the metallic carrier is problematical, since a durable, adhesive fixing of the PTFE guide bush (which is self lubricating) to the metallic carrier cannot be obtained. PTFE and metal are very difficult to bond to one another, and providing that one will be contained by the other requires some form of a positive-locking connection. The use of an intermediate connecting means between the PTFE and the metallic material provides a lasting connection between the two parts that is very difficult to attain when connecting the two parts directly.

The connector employed is preferably a metallic material, preferably zinc, and is formed in situ as a die-cast part. It is advantageous that the die-cast part forms a permanent connection with the carrier, which typically is made of a metallic material. The carrier itself will generally have a volume very much greater than that of the connecting means.

The connector is adhesively joined to the carrier and surrounds the guide bush without adhering to it. The connector and the guide bush are affixed to one another by form locking provided by the form fitting shape of the connector after it is injected into the space partially defined by the guide bush. Preferably, the connector partially overlaps the end faces of the guide bush in the radial direction. The guide bush, shaped as manufactured and requiring no subsequent deformation for its use, is arranged in the grooved depression of the die-cast part constructed as the connector. A shift in the axial direction is prevented by the overlapping of the end faces of the guide bush. On the other hand, the guide bush can rotate within the annular groove defined by the die cast part (i.e., the connector). If the rod guide is used to support rotating shafts, the relative twisting capacity of the guide bush in the die-cast part is not disadvantageous, because PTFE has a very low rate of wear. After a certain initial wear which can be disregarded, the material starts to glaze. Thereafter, the surface becomes very hard and resistant to any further wear, such as might be caused by the translatory motion of a rod within the guide bush. Thus, the rod guide according to the invention can be employed for use with rods that undergo axially reciprocal translational motion.

The gap between the guide bush and the carrier has a radial thickness no greater than the radial thickness of the guide bush. Preferably the radial thickness of the gap is one third to two thirds as thick as the guide bush. It is thereby ensured that during manufacture, subsequent to the injection of its material, the die-cast part cools quickly and is hardened. Thus, even delicate materials (which the guide bush may be), are not subjected to disadvantageously high temperature stresses which could lead to damage or destruction.

The invention is also directed to a method for manufacturing a rod guide constructed in accordance with the previous explanations. In a first process step, the guide bush and the carrier are positioned essentially concentrically to one other. In a second process step, the material of which the connector is formed is injected, in the die-casting method, into the gap and subsequently hardened. The material is preferably a zinc die-casting substance. In the method according to the invention for manufacturing the rod guide, guide bushes can be used which consist, for example, of a polymer material whose melting temperature lies markedly below the injection temperature of the die-casting substance. The injection temperature in the die-casting method attains levels of approximately 400° C. However, due to the only slight thickness of the connector constructed as a die-cast part, the die-casting substance cools off almost immediately after its injection into the mold and the die-cast part solidifies and joins radially on the outside to the carrier. Because of the exceptionally short cooling time, guide bushes formed of polymer materials (which may have relatively low melting points) can be used without undergoing damage during formation of the die-cast intermediate part.

A further advantage of this method lies in that it avoids all the problems attendant to cementing polymer guide bushes into metallic carriers. For example, PTFE does not form a durable connection with a cementing material. Additionally, the operating temperature range of minus 50° C. to plus 180° C. generally encountered in use is generally too great for a cementing material. This method obviates the need to cement the guide bushing in place, and so avoids these problems.

BRIEF DESCRIPTION OF THE DRAWINGS

The rod guide according to the invention is explained more precisely with the aid of the following drawings, wherein.

DETAILED DESCRIPTION OF THE INVENTION

Figure 1:
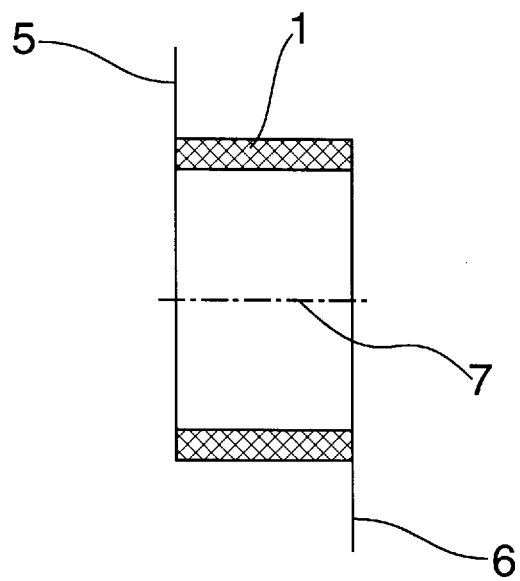
FIG. 1 is a longitudinal cross-sectional view of a guide bush constructed according to the principles of the invention.

In FIG. 1, a guide bush 1 is shown which, in this embodiment, is made of polytetraflouroethylene (PTFE). PTFE is advantageous in that it has a very low rate of wear, presents extremely low levels of friction, and glazes over shortly after being put into use so that its surface becomes very wear resistant. These properties make PTFE an excellent choice for use as the material for the guide bush 1. The self-lubricating properties of the material are of great advantage, in that the components supported by it can then be guided with little friction.

Figure 2:
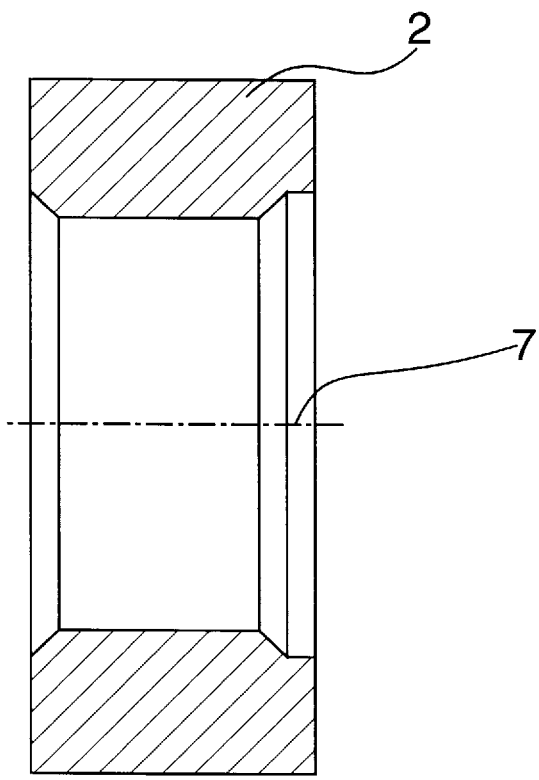
FIG. 2 is a longitudinal cross-sectional view of a carrier.

In FIG. 2 a carrier 2 is shown which consists of a metallic material. The carrier 2 has a greater radial thickness than the guide bush 1 from FIG. 1. The partial area of the carrier 2 that has the smallest inside diameter has an axial width greater than the axial width of the guide bush 1. This area is axially delimited by chamfered areas arranged on both sides which, in this exemplary embodiment, form an angle of approximately 45° with axis 7.

Figure 3:
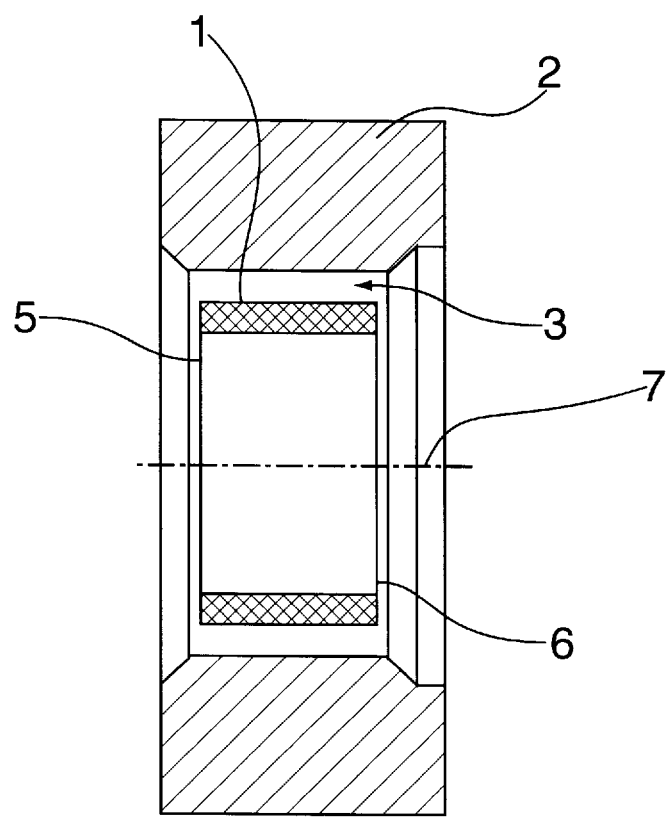
FIG. 3 is a longitudinal cross-sectional view of the guide bush and the carrier from FIGS. 1 and 2 positioned relative to one another before the injection of the die-casting substance which forms the connector.

In FIG. 3, the guide bush 1 from FIG. 1 is positioned concentrically with respect to the carrier 2. Once so positioned, a die-casting substance, which can be an alloy of zinc or essentially pure zinc, is injected into the gap 3 to form the connector 4.

Figure 4:
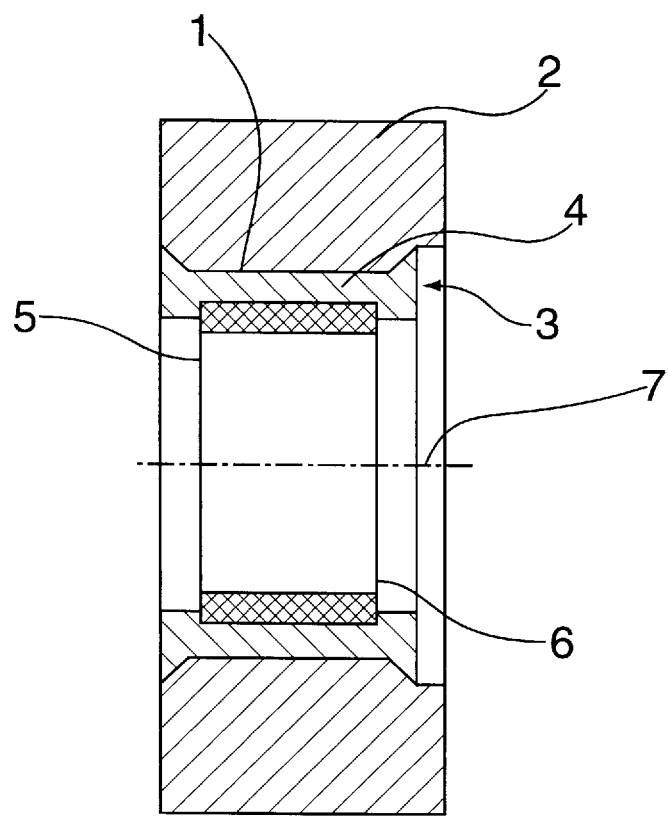
FIG. 4 is a longitudinal cross-sectional view of the completed rod guide.

In FIG. 4 the rod guide is shown in its ready-to-use state. Within the gap 3, the zinc die-cast part 4 (i.e. the connector) is form fitted to the chamfers of the carrier 2 and is form fitted to the guide bush 1 by partially overlapping the end faces 5, 6 of the guide bush 1 in the radial direction. The die-cast connector 4 is permanently affixed to the carrier 2 and surrounds the PTFE guide bush 1 without adhering to it. In this exemplary embodiment, the radial thickness of connector 4 is half as great as the radial thickness of the guide bush 1 and only a tenth as thick as the radial thickness of the carrier 2, which provides for favorable thermal conditions during manufacture.

What is claimed is:

1. A rod guide comprising:

a guide bush having an outside surface;

a carrier surrounding the outside surface of the guide bush with a radial clearance, the radial clearance defining a gap; and a connector provided in the gap, thereby joining the guide bush and the carrier, the connector being a metallic material.

2. A rod guide as set forth in claim 1, wherein the guide bush comprises a polymer material and the carrier comprises a metallic material.

3. A rod guide as set forth in claim 1, wherein the connector has a thickness that is no thicker than a thickness of the guide bush.

4. A rod guide as set forth in claim 3, wherein the connector comprises zinc.

5. A rod guide as set forth in claim 3, wherein the thickness of the connector is approximately $1/10$ a thickness of the carrier.

6. A rod guide as set forth in claim 3 wherein the thickness of the connector is in a range of approximately $1/3$ to $2/3$ the thickness of the guide bush.

7. A rod guide as set forth in claim 1, wherein the connector is a die-cast part.

8. A rod guide as set forth in claim 1, wherein the connector is joined adhesively to the carrier and surrounds the guide bush without adhering to it, and wherein the connector and the guide bush are connected to one another with form locking.

9. A rod guide as set forth in claim 1, wherein the guide bush further comprises end faces, and the connector partially overlaps the end faces in the radial direction.

10. A rod guide as set forth in claim 1 wherein the carrier has a volume greater than a volume of the connector.

11. A rod guide comprising:

a guide bush having an outside surface;

a carrier having a longitudinal bore therethrough, the guide bush disposed within the longitudinal bore of the carrier, wherein a clearance between the longitudinal bore of the carrier and the outside surface of the guide bush defines a gap; and a connector comprising metal, the connector disposed in the gap, the connector joining the carrier to the guide bush.

12. A rod guide as set forth in claim 11 wherein the guide bush is a polymer.

13. A rod guide as set forth in claim 11 wherein the carrier is a metal.

14. A rod guide as set forth in claim 11 wherein the connector has a thickness that is no thicker than a thickness of the guide bush.

15. A rod guide as set forth in claim 11 wherein the connector is formed in situ as a die-cast part.

16. A rod guide as set forth in claim 11 wherein the connector covers the outside surface of the guide bush, partially covers the top face adjacent to the outside surface of the guide bush, and partially covers the bottom face adjacent to the outside surface of the guide bush, the connector thereby forming a groove that holds the guide bush.

17. A rod guide as set forth in claim 11 wherein the connector joins to the carrier adhesively.

18. A rod guide as set forth in claim 11 wherein the carrier has a volume greater than a volume of the connector.

19. A rod guide comprising:

a guide bush having an outside surface;

a carrier having a longitudinal bore therethrough, the guide bush disposed within the longitudinal bore of the carrier, wherein a clearance between the longitudinal bore of the carrier and the outside surface of the guide bush defines a gap; and a connector disposed in the gap, the connector joining the carrier to the guide bush, wherein the connector is substantially made of zinc.

* * * * *